United States Patent [19]
Goodberlet et al.

[11] Patent Number: 5,054,027
[45] Date of Patent: Oct. 1, 1991

[54] PULSED LASER

[75] Inventors: James Goodberlet, Reading; James G. Fujimoto, Cambridge; Peter A. Schulz, North Andover; Jyhpyng Wang, Cambridge, all of Mass.

[73] Assignee: Massachusetts Institute of Technology, Cambridge, Mass.

[21] Appl. No.: 418,882

[22] Filed: Oct. 10, 1989

[51] Int. Cl.$^5$ .............................................. H01S 3/10
[52] U.S. Cl. ...................................... 372/25; 372/18; 372/21; 372/97
[58] Field of Search ................... 372/21, 18, 9, 97, 93, 372/25, 10, 108

[56] References Cited

U.S. PATENT DOCUMENTS

| | | | |
|---|---|---|---|
| 3,628,186 | 12/1971 | Ashkin et al. | 372/18 |
| 3,700,307 | 10/1972 | Glenn | 372/18 |
| 4,344,042 | 8/1982 | Hon | 372/21 |
| 4,635,263 | 1/1987 | Mollenauer | 372/18 |
| 4,648,092 | 3/1987 | Ewbank et al. | 372/18 |
| 4,914,658 | 4/1990 | Stankov et al. | 372/18 |

FOREIGN PATENT DOCUMENTS

WO87/04871 12/1987 PCT Int'l Appl.

OTHER PUBLICATIONS

K. J. Blow and B. P. Nelson, Opt. Lett. 13, 1026 (1988).
C. P. Yakymyshyn, J. F. Pinto, and C. R. Pollock, Conference on Lasers and Electro-Optics, 1989 Technical Digest Series, vol. 11 (OSA, Washington, D.C. 1989), paper FQ3.
F. Ouellete and M. Piche, Pulse Shaping and Passive Mode Locking with a Nonlinear Michelson Interferometer, Oct. 15, 1986, pp. 99-103.
J. Mark, L. Y. Liu, K. L. Hall, H. A. Haus and E. P. Ippen, Femtosecond Pulse Generation in a Laser with a Nonlinear External Resonator, 1989 Optical Society of America, pp. 48-50.
L. F. Mollenauer and R. H. Stolen, the Soliton Laser, Jan. 1984, pp. 13-15.
K. J. Blow and D. Wood, J. Opt. Soc. Am. B.5, 629 (1988).

Primary Examiner—Frank Gonzalez
Assistant Examiner—Susan S. Morse
Attorney, Agent, or Firm—Wolf, Greenfield & Sacks

[57] ABSTRACT

This invention relates to a tunable solid-state laser which generates ultrashort output pulses with continuous wave pumping. The device includes a lasing medium having a gain cross section of $10^{-18}$ cm$^2$ or less and mode beating characteristics, which lasing medium is mounted in a laser cavity. A continuous wave pumping beam is applied to the lasing medium causing an output, a portion of which is applied to an intensity dependent nonlinear cavity. The output applied to the nonlinear cavity is retroreflected back through the cavity and is interferometrically combined with the laser output. The relative lengths of the cavities are initially selected such that phase changes caused by the nonlinear medium result in substantially maximum enhancement of intensity peaks of the laser output, causing self starting of pulsed operation. Once pulsed operation is achieved, the cavity lengths may be adjusted to optimize interferometric addition of peak outputs and interferometric cancellation of pulse wings, resulting in a laser output formed of ultrashort pulses. For preferred embodiments, the laser is a titanium sapphire laser, and the nonlinear cavity contains a single mode optical fiber which induces intensity dependent phase changes in an optical signal passing therethrough. A feedback circuit is preferably provided to stabilize pulse operation.

27 Claims, 2 Drawing Sheets

PULSED LASER

FIELD OF THE INVENTION

This invention relates to pulsed lasers and more particularly to a tunable solid state laser generating ultrashort output pulses with continuous wave pumping.

BACKGROUND OF THE INVENTION

There are many applications where ultrashort laser pulses (i.e., laser pulses in the picosecond to femtosecond range) are required. Such applications include fundamental research in chemistry, physics, and biology involving time domain spectroscopy measurements and optical ranging and commercial applications including testing of optoelectronic devices, medical technology, optical communication and signal processing.

Heretofore, ultrashort laser pulses have been obtained utilizing two general techniques. These techniques are (a) active mode locking requiring time varying modulation of either laser gain or loss; and (b) passive mode locking involving the use of saturable absorbers, usually in the form of a dye, within the laser cavity. Active mode locking is disadvantageous in that it generally requires a relatively high degree of laser system complexity and cost. In such systems, either the pump laser must be constructed to produce short pulses, or an active modulator must be incorporated into the laser cavity. Thus, while active mode locking preserves laser tunability, this tunability is achieved at the expense of system complexity and cost. Cost is also increased due to the expensive, high stability, RF driver which is required for this approach.

Conversely, passive mode locking with a saturable absorber media typically has a spectral bandwidth that constrains the laser operating wavelength. While femtosecond pulses are easily generated in passive systems, the tunability of such systems is restricted to about 10–20 nm. The cost of maintaining and replacing saturable absorbers can also be relatively high, being comparable to that for actively mode-locked systems.

While active mode locking is capable of providing pulsed laser operation in the picosecond range, further processing of the laser output is normally required in order to achieve operation in the femtosecond range. One technique which has been employed to shorten laser output pulses and improve active mode locked performance is to provide an external cavity utilizing a nonlinear optical fiber. The output from the main laser cavity is interferometrically combined with a portion of the output beam which has been directed into the nonlinear optical fiber and retroreflected back to the main laser cavity. Pulse shortening is achieved by properly matching the length of the external cavity and the main cavity, such that interferometric addition of the pulse peak and interferometric cancellation of the pulse wings is obtained. However, all current systems utilizing nonlinear external cavities have demonstrated pulse shortening of a laser already operating as a short pulse laser. Thus, these lasers have all of the system complexity, cost and operating constraints discussed above in addition to the complexity and cost involved in pulse shortening through the use of the nonlinear external cavity.

A need therefore exists for a method and apparatus for generating an ultrashort pulsed laser output which is tunable, generally over the full tuning range of the laser utilized, without involving the high cost and complexity of current active mode-locked/coupled cavity systems. Basically, the system should be capable of utilizing a continuous wave pump signal to produce ultrashort laser output pulses in a single operation.

SUMMARY OF THE INVENTION

In accordance with the above, this invention provides a pulsed laser which utilizes a nonlinear external cavity to obtain ultrashort laser output pulses from a continuous wave pump beam in a single relatively simple and inexpensive operation. More particularly, the pulsed laser of this invention includes a lasing medium with a low gain cross section of approximately $10^{-18}$ cm or less mounted in a laser cavity such that strong mode beating characteristics or equivalent noise fluctuations are exhibited. A continuous wave pumping beam is applied to the laser causing the laser to generate an output. An external cavity containing an intensity dependent nonlinear medium is provided to which a portion of the laser output is applied. The output applied to the external cavity is retroreflected back to the main laser cavity and is interferometrically combined with the laser output. The relative lengths of the laser cavity and the external cavity are, at least initially, selected such that phase changes caused by the nonlinear medium result in substantially maximum enhancement of intensity peaks in the laser output. This causes a pulsed laser output, the pulses of which may be shortened by adjusting the relative cavity lengths, once pulse operation has been achieved, such that, when the beams are interferometrically combined, there is interferometric addition of pulse peaks and interferometric cancellation of pulse wings, resulting in a laser output formed of ultrashort pulses. For the preferred embodiment, the lasing medium is a titanium sapphire ($Ti:Al_2O_3$) laser, and the external cavity contains a single mode optical fiber which induces intensity dependent phase changes in an optical signal passing therethrough. The length of at least one of the cavities may be adjusted to maintain correct phase relationships. The width of the laser output pulses may be further reduced by sending the output pulses through a dispersive delay line which compensates for fiber or crystal dispersion inside the pulsed laser.

For one embodiment of the invention, a beam splitter is provided inside the laser cavity, the beam splitter directing part of the laser output to a nonlinear arm or cavity and part through a linear arm, both parts being reflected back to be interferometrically combined at the beam splitter. The length of the nonlinear arm and of the linear arm are adjusted to achieve the desired phase relationship.

The foregoing and other objects, features and advantageous of the invention will be apparent from the following more particular description of preferred embodiments of the invention as illustrated in the accompanying drawings.

IN THE DRAWINGS

DETAILED DESCRIPTION

This invention provides laser pulse generation in the femtosecond range utilizing passive reactive nonlinearity. Thus, full tuning over the broad tuning range of the solid state laser is preserved without the use of either external gain or loss modulation.

Figure 1:
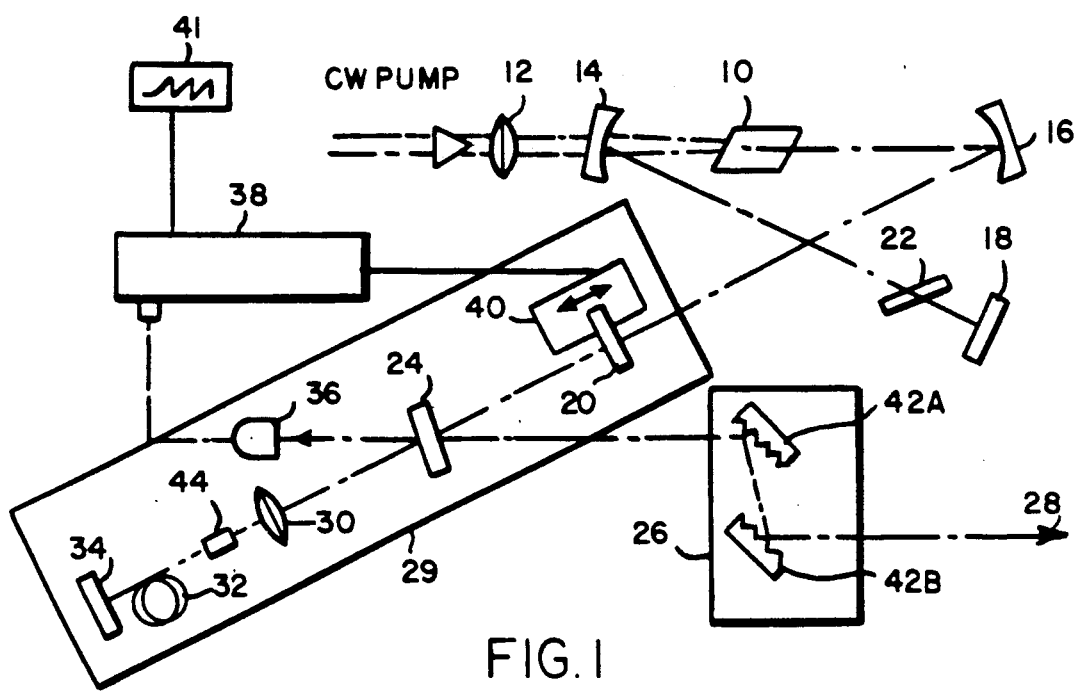
FIG. 1 is a semi schematic diagram of a first embodiment of a pulsed laser employing the teachings of this invention.
Figure 2A:
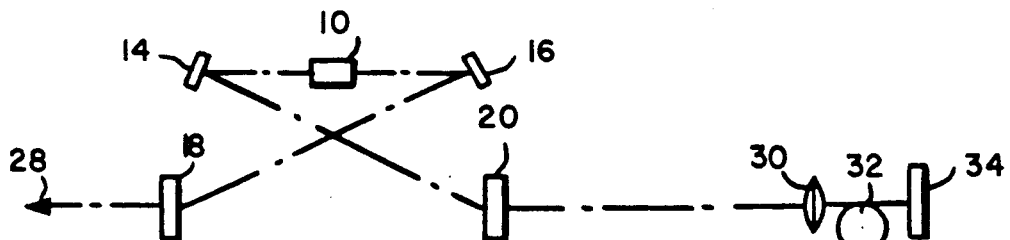
FIGS. 2A and 2B are diagrams for alternative configurations for the embodiment shown in FIG. 1.
Figure 2B:
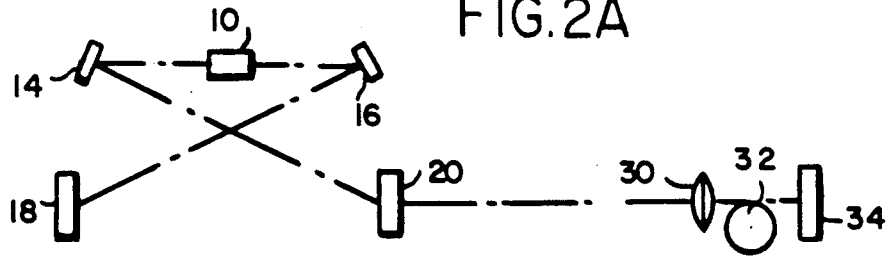

FIG. 1 illustrates one embodiment of the invention wherein a Ti:Al$_2$O$_3$ crystal 10, is continuous wave pumped from a suitable continuous wave laser beam source, such as a continuous wave argon-ion laser. A low noise pump source is desired, laser source being preferred because such sources have lower noise than other pump sources. The pump beam is applied through a suitable lens 12 to the Ti:Al$_2$O$_3$ crystal 10 which is preferably located at the center of a main laser cavity formed by mirrors 14, 16, 18 and 20. A standard tuning plate 22 is provided in the main cavity to permit the Ti:Al$_2$O$_3$ laser to be tuned over its relatively wide tuning range, from approximately 700 nm to approximately 1,000 nm. Mirror 20 functions as an output coupler to transmit a portion of a laser energy in the cavity to beam splitter 24. Other mirrors in the main cavity may be chosen as output couplers and the external cavity relocated. Figures 2A and 2B show schematics of alternative arrangements. The percentage of the laser energy transmitted by coupler 20 might range for example from 5 to 35 percent.

Beam splitter 24 reflects a portion of the beam applied thereto to dispersive delay 26 and through the delay to the system output 28. Another portion of the signal applied to beam splitter 24 is transmitted through lens 30 (and GRIN lens 44) into the optical fiber 32. All surfaces of optics used to couple into the fiber should be antireflection coated or index matched to minimize unwanted reflections from the fiber. Any alternative method for minimizing unwanted reflections from the fiber would also constitute an equivalent approach. For example the end of the fiber may be angle ground and coupling accomplished using standard lenses or an antireflection dielectric coating applied directly to the fiber end. The fiber acts as a nonlinear medium with an intensity dependent index of refraction which results in intensity dependent phase changes in the optical signal applied thereto. The optical signal applied to mirror 34 is retroreflected back through fiber 32, GRIN lens 44 and lens 30 to beam splitter 24 and back into the laser cavity. The schematic shows the fiber in contact with the end mirror 34, however, in an alternative realization the fiber may be located anywhere in the external cavity so long as provision is made to reflect the beam in the fiber back into the main laser cavity. A high reflection dielectric coating may also be applied directly to the end of the fiber eliminating the need for mirror 34.

Finally, a small portion of the beam is applied to detector 36 which measures output power, the second harmonic of output power and/or the output spectrum. Details of a preferred detector 36 are shown and described in conjunction with the embodiment of FIG. 3. The output from detector 36 is applied to a stabilization circuit 38. Since the detected parameters are a known function of output pulse shape, and thus of relative cavity length, variations in these parameters, resulting from variations over time in the phase match between the main and external cavities, may be compensated for by stabilization circuit 38 controlling piezoelectric transducer 40 to adjust the position of mirror 20, thereby controlling the relative lengths of the two cavities. The piezoelectric transducer 40 may be attached to other cavity mirrors to produce the same effect.

Another input to stabilization circuit 38 is the output from ramp signal generator 41. The manner in which circuit 38 utilizes this input will be described later.

Dispersive delay line 26, which is utilized to further reduce pulse width or duration, may consist of a pair of diffraction gratings 42 as shown in FIG. 1, a pair of prisms, or other suitable means known in the art for performing the function. In the alternative, the dispersive delay line can be incorporated directly into nonlinear external cavity 29. This would produce pulse narrowing directly in the laser.

It is also possible to restrict the laser bandwidth in the main laser cavity so that the output pulses directly from the laser are transform limited. This would eliminate the need for a dispersive delay line but result in the generation of longer pulses. Bandwidth restriction may also be achieved by placing birefringent filters in the main laser cavity.

Figure 4:
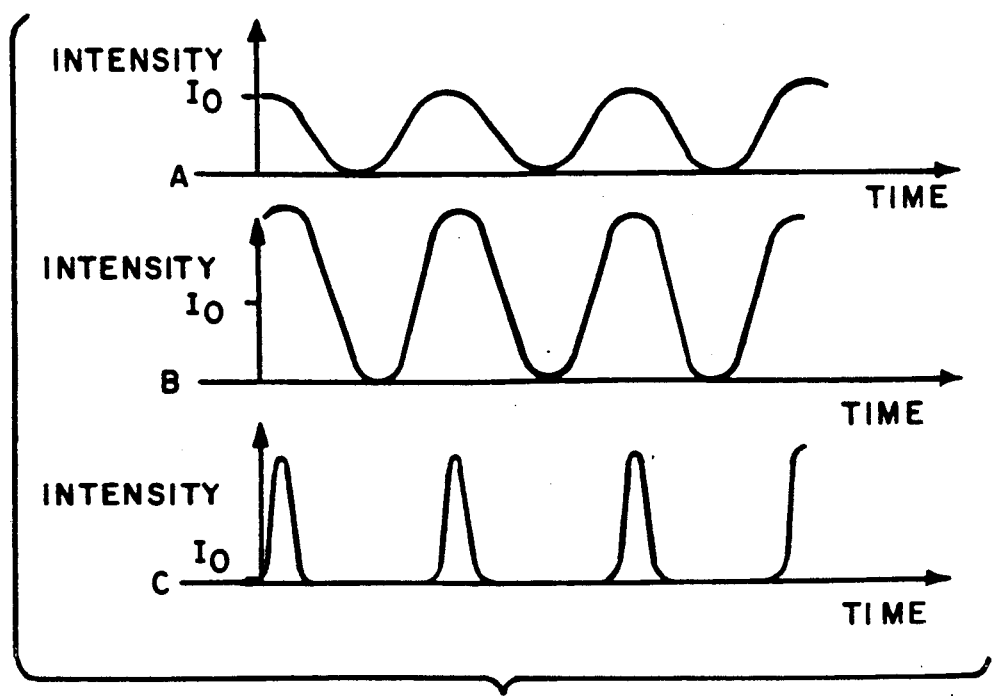
FIG. 4 is a diagram illustrating laser outputs obtained from the systems of FIGS. 1-3 at various times in the operation of the system.

In operation, the Ti:Al$_2$O$_3$ laser, when continuous wave pumped, would ordinarily generate a continuous wave laser output which is generally as shown on line (A) of FIG. 4. It is noted that this output evidences a characteristic known as "mode beating" which results in the output having a cyclic ripple or modulation. For the Ti:A$_2$O$_3$ laser, the modulation depth is approximately 80%. The modulation frequency corresponds to cavity length, its periodicity being roughly equal to or less than the round trip time in the main cavity.

Before describing the operation in detail, some theoretical discussion on the system is useful. The system shown in FIG 1 is theoretically equivalent to a single laser cavity with a nonlinear reflective mirror. This effect results from the fact that the field from the nonlinear external cavity interferometrically interferes with the optical beam at output mirror 20 causing the output mirror to have an effective power reflectivity which depends on the phase of the fields which produce the interference. This nonlinear effective reflectivity of the output coupler can be calculated from the following equation:

$$R_{NL} = \frac{R + \xi B^2 - 2B\sqrt{\xi R}\cos(\phi_l + \phi_{nl})}{1 + R\xi B^2 - 2B\sqrt{\xi R}\cos(\phi_l + \phi_{nl})} \quad (1)$$

where R is linear output coupler reflectivity, $\xi$ is coupling efficiency to the fiber, B is the beam splitter transmission, $\Phi_l$ is the linear phase setting of the external cavity relative to the main cavity and $\Phi_{nl}$ is a nonlinear phase term which will be described later.

The total phase difference between the two cavities ($\Phi$) is defined by the equation:

$$\phi = \phi_l + \phi_{nl} \quad (2)$$

Figure 5:
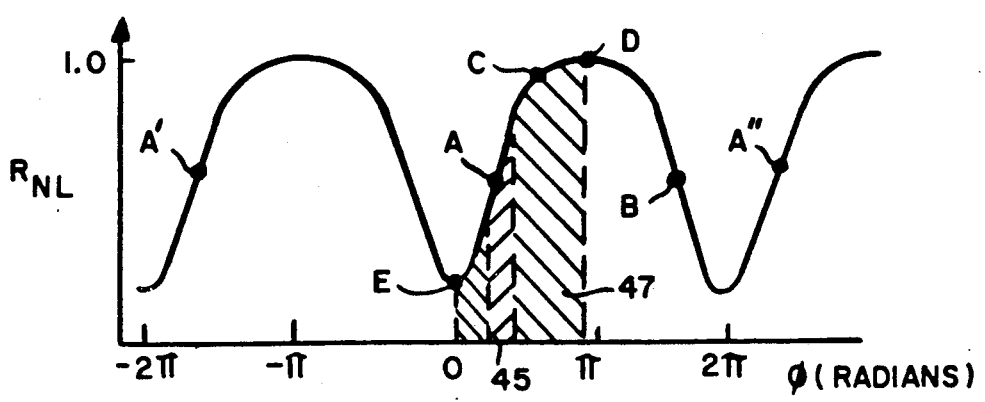
FIG. 5 is a diagram illustrating the relationship between nonlinear effective reflectivity of the output coupler and the phase difference between the cavities, including preferred operating points and ranges for such relationship.

With $\Phi_l$ and $\Phi_{nl}$ being defined as above, these terms may be expressed mathematically as follows:

$$\phi_l = \frac{4\pi\Delta L}{\lambda} \quad (3)$$

$$\phi_{nl} = \frac{2\pi n_2 L_f I(t)}{\lambda} \quad (4)$$

Where $\Delta L$ is the difference in cavity length between the two cavities, $L_f$ is the length of the nonlinear fiber 32, $\lambda$ is the lasing wavelength, $I(t)$ is intensity in the fiber and varies as a function of time and $n_2$ is the nonlinear coefficient of the nonlinear medium. For an optical fiber, $n_2 = 3.2 \times 10^{-16}$ cm$^2$/W. While other nonlinear mediums may have a negative value of $n_2$, in the following discussion a positive value for $n_2$ will initially be assumed. Since $\Phi_{nl}$ is, as indicated by equation 4, intensity dependent, $R_{NL}$ is also a function of intensity. FIG 5 is a typical graph of $R_{NL}$ versus $\phi$. For the evolution of mode beating or noise fluctuations, such as those shown on line A of FIG. 4, to short pulses shown on line C of this figure, the relative cavity lengths should initially be chosen such that the linear phase $\Phi_l$ is at point A on the curve of FIG. 5. With $\Phi_l$ at this point, $\Phi$ will increase with higher intensities due to the nonlinear phase $\Phi_{nl}$. Thus higher intensities are preferentially reflected into the main cavity and amplified by the gain medium. Since the slope of the curve in FIG. 5 is maximum at approximately point A, this results in substantially maximum enhancement of the laser intensity peaks as a result of phase changes causes by the nonlinear medium. For example, if the linear phase $\Phi_l$ were selected to be at points C or E, the small phase changes caused by $\Phi_{nl}$ as a result of the initial mode beating intensity variations would have too small an effect on reflectivity to enhance the intensity peaks sufficiently to cause the laser to go into pulsed operation. If the relative lengths were originally chosen so as to be operating at points B or D, a peak in intensity would actually be suppressed so that fluctuations could not evolve into short pulses, and the laser would continue to run in a continuous wave mode. The areas of maximum slope on the curve of FIG. 5 for which the difference in cavity length, and thus in cavity phase, would result, all other conditions having been met, in a continuous mode beating wave evolving into a pulsed wave is illustrated by the shaded area 45 in FIG. 5.

Self starting ability is increased when the rate of change of reflectivity is increased with respect to intensity. The rate of change of reflectivity is proportional to the derivative of the nonlinear effectivity reflectivity with respect to intensity ($I(t)$). For optimal self-starting, the criteria are:

$$\frac{dR_{NL}}{dI(t)} > 0 \quad \frac{d^2R_{NL}}{d^2I(t)} = 0 \quad (5)$$

The first derivative equation of equations (5) defines the area 47 while the second derivative equation defines point A. The second derivative equation thus implies that the self-starting force is maximized. This criteria determines the phase setting $\Phi_l$ and thus the relative cavity length settings which maximizes self-starting.

The rate of change of reflectivity can also be increased by optimizing values for output mirror 20, beam splitter 24 and the fiber coupling efficiency according to equation (1). In addition, the magnitude of the differential reflectivity, and thus the self-starting capability, can be increased by increasing the nonlinear phase shift represented by equation 4. This can be achieved by increasing the intensity of the beam intensity in the nonlinear medium (i.e., the optical fiber 32), the length $L_f$ of the nonlinear medium or the strength $n_2$ of the nonlinearity. The latter enhancement can be achieved by using an enhanced nonlinearity fiber.

The time required for the laser to form short pulses from mode beating or noise fluctuations is inversely related to the magnitude of the differential reflectivity. As the differential reflectivity is optimized, the starting time decreases. For a Ti:AL$_2$O$_3$ lasing medium, typical starting times to achieve pulse operation are several hundred microseconds. It is desirable that the system be designed for the shortest possible starting time. While a steep positive slope for the nonlinear effective reflectivity is a necessary condition for self-starting from continuous mode to pulse mode operation, other conditions are also required. The system must be built to have sufficient mechanical stability so that the differential reflectivity is not varied by mechanical vibrations causing variations in the relative cavity lengths and thus the linear phase $\Phi_l$. For example, if as a result of mechanical vibrations or the like, the relative lengths of the cavities is varied such that the system is no longer operating in the area 45, pulse formation will be disrupted and the system will be maintained in a continuous wave mode. Mechanical stability for achieving pulse operation is obtained primarily by the manner in which the various components are designed and mounted. Cooling the lasing medium may also enhance mechanical stability. As will be discussed later, mechanical stability is also important for sustained short pulse operation of the laser since this also requires length stabilization. However, this stability may be achieved through feedback, using elements 36–40, in addition to the initial design of the system.

While preferably the system is designed to bring the relative cavity lengths to self-starting area 45, this may also result from mechanical instability in cavity length. Such mechanical instability may also result in operation no longer being in area 47, causing the system to return to continuous wave mode.

One of the most critical criteria for self-starting is that pulse broadening effects from the laser gain are negligible. If pulse broadening is larger than pulse shortening produced by the differential reflectivity, the system will not be able to go into a pulsed mode.

Gain saturation is the dominant effect which produces pulse broadening. Gain saturation is determined by the gain cross section of the lasing medium and the intensity/area of the laser beam in the gain. If the gain cross section is large, then gain saturation produces more pulse broadening and self-starting is inhibited. Self starting should be achievable for gain cross sections of $10^{-18}$ cm$^2$ or less. In addition, gain saturation can be reduced to some extent by laser cavity design, by increasing the area of the laser beam in the gain medium and operating the laser near threshold. However, the properties of the laser material are the dominant factor in reducing pulse broadening and achieving self-starting. It is therefore believed important that the laser medium have a gain cross section of less than $10^{-18}$ cm$^2$.

As may also be seen from FIG. 5, once the system has self-started and reached steady state, short pulse operation, the shortest pulse output is in general not obtained for cavity length/phase differences which produce the best self-starting results. Sustained short pulse operation could be achieved anywhere within the shaded area 47; however, the phase setting which produces the shortest pulses is the one which provides for the greatest positive increase for pulse peaks and the greatest suppression for the pulse wings (i.e., the out-of-phase signals). It is seen that this would be the area around point E which is outside the area 45 at which self-starting will initiate. As previously indicated, the discussion to this point has assumed a positive nonlinear index of refraction ($n_2$), implying increasing nonlinear phase $\Phi_{nl}$ with increasing intensity. If, however, the nonlinear medium has a negative index of refraction, the system would function on the negative slope side of each cycle rather than the positive side. Thus, the optimum operating point for self-starting would be point B rather than point A. In the discussion to follow, circuitry for achieving operation at the desired points at the proper times in an operating cycle in order to achieve self-starting and to achieve the shortest pulse outputs once pulse operation is achieved are described.

Finally, it should be noted that the cavity length must be absolutely matched within a few tens of microns because, once short pulses are formed, the pulses which travel around the main laser must temporarily overlap with the pulses which travel around the external cavity in order for there to be interference. Since the system acts like an interferometer, the cavity lengths must be stabilized within a small fraction of a wavelength. However, they can be varied in multiples of a wavelength within the aforementioned several tens of micron range. Thus, in FIG. 5, self-starting, in addition to occurring at point A and the area immediately adjacent thereto, might also occur at points A' and A" on the curve, and the points immediately adjacent thereto. Pulse shortening might also occur on these adjacent positive curve slopes. However, if the phase difference becomes so great that the pulses no longer overlap, then pulsed operation will not be achieved. The required temporary overlap of the pluses can also be achieved if the external cavity is an integral multiple of the main cavity length (for example, two or three times the main cavity length).

Referring again to FIG. 1, assume initially that the lengths of the cavities are substantially equal so that there is virtually zero phase difference and the system is operating near point E on the curve of FIG. 5. As previously discussed, pulsed operation will not be achieved at this level, the variations in $\Phi_{nl}$ being insufficient to cause this to occur. The first step in the operation is to apply the ramp signal from ramp generator 41 to circuit 38. This causes a signal to be applied to piezoelectric crystal 40 to move mirror 20 in a manner to increase the difference in length, and thus the difference in phase, between the two cavities. This difference increases as the ramp signal increases until the phase difference moves into area 45 of the curve shown in FIG. 5, approaching point A on the curve. Ramp 41 is slow enough so that when the phase moves into area 45, it remains in this area long enough for pulsed operation to be achieved. For example, for a Ti:Al$_2$O$_3$ laser medium, the ramp would have to be slow enough so that the pulse length, and thus phase difference, would remain in the area 45 in excess of several hundred microseconds. When this point is reached, assuming all of the other conditions previously discussed have been met, the system should self-start into pulsed operation. As is apparent from lines A and B of FIG. 4, this results in a substantial increase in the peak output power from the laser. The operation in pulse mode can be detected using the second harmonic and/or the spectrum of the output detector 36. Detector 36 sends a signal to circuit 38 indicating that the system has entered pulsed mode, permitting cavity lengths to be adjusted to optimize pulse shortening.

Since fiber 32 varies the phase of a signal applied thereto as a function of intensity, the phase shift for higher intensity signals being greater than that for lower intensity signals, the lengths of the cavities can be adjusted such that, when the retroreflected optical signal received at beam splitter 24 from external cavity 29 is interferometrically combined at output mirror 20 with the optical signal in the main laser cavity, there will be interferometric addition of the pulse peaks and interferometric cancellation of the pulse wings. This is achieved in the system of FIG. 1 by adjusting the set point in stabilization circuit 38 such that it maintains the lengths of the cavities substantially equal, and thus the relative linear phase $\Phi_l$ near point E on the curve of FIG. 5. This results in the formation of a train of picosecond or subpicosecond width laser pulses such as those shown on line (C) of FIG. 4. The transition in the output from the continuous wave signal shown on line (A) to the picosecond range pulsed output shown on line (C) occurs over a short transition period in the order of 200$\mu$s. Further reduction in pulse width or duration to pulses in the femtosecond range, for example 220 fs in a particular experiment, have been achieved by passing the output from the laser cavities through dispersive delay 26. The technique and mechanism of using an external cavity having a nonlinear fiber and interferometric addition of the outputs from the main laser and external cavities to shorten the pulses from a laser that is already actively modelocked is known in the art and discussed in a number of articles including:

K.J. Blow and B.P. Nelson, Opt. Lett. 13, 1026 (1988);

K.J. Blow and D. Wood, J. Opt. Soc. Am. B. 5, 629 (1988);

J. Mark, L. Y. Liu, K. L. Hall, H.A. Haus, and E.P. Ippen, Opt. Lewtt. 14, 48 (1989);

C.P. Yakymyshyn, J.F. Pinto, and C.R. Pollock, Conference on Lasers and Electro-optics, 1989 Technical Digest Series, Vol. 11 (OSA, Washington, D.C., 1989), paper FQ3.

However, in all of these references there is active mode locking to achieve pulsed operation prior to utilizing the nonlinear cavity for pulse shortening, and none of these prior articles discuss using this technique when starting with a continuous wave input.

Experimental studies on the Ti:Al$_2$O$_3$ laser have developed numeric and analytic models describing startup of pulsed operation from continuous wave operation. Results of these studies indicate that optimizing cavity coupling, enhancing nonlinearity, optimizing mode beating characteristics, and reducing gain cross section enhance self-starting ability. Cavity coupling, nonlinearity, and (mode beating or noise fluctuations of equivalent intensity) effect pulse shortening velocity. Noise fluctuations would need to be fast noise fluctuations with a width equal to or shorter than the cavity round trip time. Any enhancement in these properties will strengthen pulse shortening force.

Mode beating is enhanced by placing the lasing medium near the center of the laser cavity, placement controlling both the depth of the mode beating fluctuations and the output frequency. Gain cross section effects pulse broadening velocity and a reduction in cross section, and thus gain saturation, will reduce pulse broadening forces. The gain cross section and saturation effects may be modified by choosing different lasing mediums or by changing mode area in the lasing medium. In particular, it is desired to minimize the broadening per pass of the lasing medium, this preferably being accomplished by increasing the mode area in the lasing medium, thereby decreasing the effective gain cross section. For a system to self-start, the pulse shortening velocity must sufficiently exceed the pulse lengthening velocity.

While for the preferred embodiment, the lasing medium is Ti:Al$_2$O$_3$, similar mode locked behavior should be achieved in lasing materials with properties similar to Ti:Al$_2$O$_3$. One important property of a lasing material is its gain cross section $\sigma$ which governs its gain saturation. Ti:AL$_2$O$_3$ has a gain cross section $\sigma$ of $\sim 3 \times 10^{-19}$ cm$^2$. Other possible lasing materials include Nd:YAG, Nd:YLF, Nd:Glass, Forsterite and other materials which have gain cross sections $\sigma$ of in the $10^{-19}$ cm$^2$ range and are thus comparable to the gain cross section of Ti:Al$_2$O$_3$. To achieve pulsed operation, the lasing medium should have a gain cross section $\sigma$ of approximately $10^{-18}$ cm$^2$ or less.

Thus, various characteristics of the Ti:Al$_2$O$_3$ laser, including the mode beating characteristics of this laser and gain saturation, permit the desired narrow pulsed output to be obtained from a continuous wave input. Such results should be obtainable utilizing other lasers which have similar characteristics.

The feedback circuit provided by detector 36, stabilization circuit 38 and piezoelectric transducer 40, compensates for acoustic noise, long term temperature induced variations in cavity length, mechanical vibration and other transient or long term factors which might cause variations in the phase relationship between the main laser and external cavities. A negative feedback circuit with a bandwidth of a few kilohertz and a dynamic range of several micrometers is sufficient to stabilize the two cavities within a fraction of a wavelength and to achieve stable operation. To the extent required, the relative phase of the main laser cavity and the external cavity could be adjusted by changing the set point for the feedback circuit. While for the preferred embodiment, it is the length of both cavities which is controlled to maintain a correct phase relationship for the interfering outputs, the length of either the main cavity, the external cavity or both could be adjusted to achieve this objective. The length of the optical fiber could also be adjusted.

Figure 3:
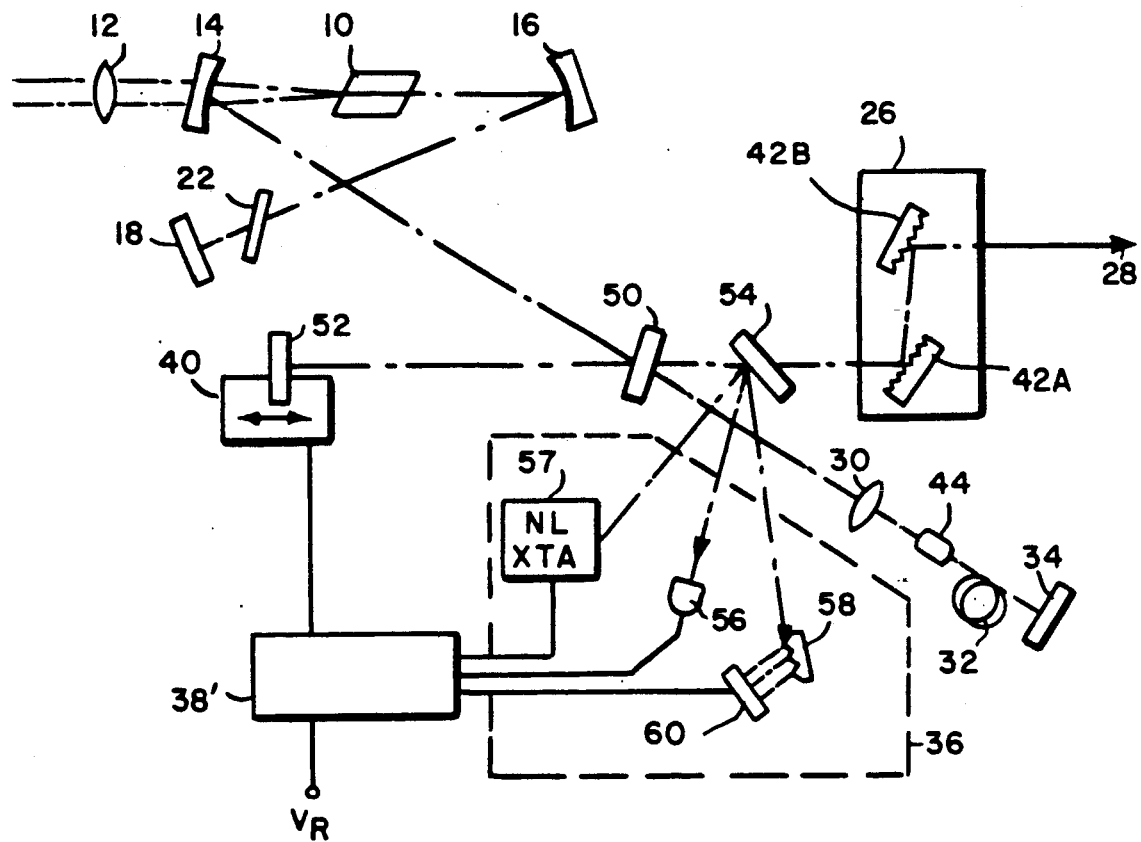
FIG. 3 is a semi schematic diagram of a second embodiment of a pulsed laser employing the teachings of this invention.

FIG. 3 illustrates an alternative embodiment of the invention wherein the nonlinear external cavity is inside the main cavity rather than outside this cavity. Generally, for this embodiment of the invention, the end mirror 20 is replaced by a Michaelson interferometer. Beam splitter 50 transmits an optical beam through one arm of the interferometer containing the nonlinear cavity consisting of fiber 32 and related components.

Beam splitter 50 also directs the beam through a second arm of the interferometer to mirror 52. By adjusting the lengths of the two arms of the interferometer such that the time of travel of an optical beam from beam splitter 50 through both arms is substantially equal, the desired interferometric addition is achieved, resulting in the desired conversion of the continuous wave input into a short pulsed output.

A beam splitter 54 is also provided between beam splitter 50 and dispersive delay 26 to direct a portion of the output to detector 36. This detector includes a detector 56 which senses changes in the laser output power, a nonlinear crystal 57 which generates the second harmonic of the laser output, yielding a signal which is proportional to the square of the laser intensity and a defraction grating 58 which provides a spectrum of the laser output which is detected by a photodetector or detector array 60. Output power is a known function of phase difference, and relative cavity lengths can be adjusted to maintain a selected power level. The second harmonic output from crystal 56 is a measure of pulse duration, since the peak intensity is approximately inversely proportional to the pulse duration. When the laser operates continuous wave, the second harmonic is negligible. The spectrum of the laser output is also a measure of short pulse performance. When the laser produces short pulses, the spectrum is broad, while when the laser operates in continuous wave, the spectrum is narrow. In order to obtain optimum short pulse performance, the outputs from the detectors 56, 57 and 60 are all applied to a modified stabilization circuit 38' which controls a piezoelectric crystal 40 attached to adjust the position of mirror 52 in a linear arm of the interferometer. By having the feedback circuit responsive to a combination of inputs, higher precision is obtained in stabilizing the system and maintaining a given pulse duration.

As previously indicated, the feedback circuit controls stabilization circuit 38' once pulse operation has been detected by the detectors. Self starting may be achieved, as for the embodiment of FIG. 1, by applying a ramp signal to the stabilization circuit 38' or, in the alternative, by applying a selected reference potential to the stabilization circuit which will cause the cavity lengths to be adjusted so as to be within the region 45. The ramp arrangement of FIG. 1 is preferable in that it may be difficult to select a single voltage level which would be optimum for this purpose, permitting feedback control of the relative length of the two arms of the interferometer, and thus permitting a desired phase relationship to be maintained. Since it is difficult to theoretically predict the optimum cavity settings for self-starting or for shortest pulse output, the feedback circuit could be utilized to empirically determine these settings.

Except as indicated above, the circuit of FIG. 3 functions in the same manner as described previously for the circuit of FIG. 1, with common elements having the same numbers, and permits the same results to be achieved. The configuration of FIG. 3 may be advantageous in some applications in that it is a potentially more compact configuration.

While the invention has been shown and described above with respect to preferred embodiments, it is apparent that the foregoing and other changes in form and detail may be made therein by one skilled in the art without departing from the spirit and scope of the invention.

What is claimed is:

1. A pulsed laser comprising:
   a lasing medium mounted in a laser cavity, said medium having a gain cross section of approximately $10^{-~}$cm$^2$ or less, the cavity having mode beating characteristics or equivalent noise fluctuations which result in an output having intensity peaks and intensity minimums;

means for continuous wave operation of said laser, causing said laser to generate an output;

an external cavity containing an intensity dependent, nonlinear medium;

means for applying a portion of the laser output to said external cavity;

means for causing the output applied to the external cavity to be retroreflected back through the external cavity; and means for interferometrically combining the laser output and the retroreflected output from the external cavity;

the relative lengths of said laser cavity and said nonlinear cavity being such that, at least initially, phase changes caused by the nonlinear medium result in substantially maximum enhancement of said intensity peaks, whereby a pulsed laser output is achieved.

2. A laser as claimed in claim 1 including an output coupler through which laser outputs are coupled between said laser cavity and said external cavity, said coupler having a nonlinear effective reflectivity ($R_{NL}$), wherein at least said difference in length between said cavities results in a phase difference $\phi$ for said cavities $R_{NL}$ varying as a function of $\phi$, and wherein said relative cavity lengths are selected such that reflectivity at said intensity peaks minus the reflectivity at intensity minimums is maximized.

3. A laser as claimed in claim 2 wherein said relative cavity lengths are selected such that $d^2R_{NL}/d^2I(t)=0$.

4. A laser as claimed in claim 2 wherein $dR_{NL}/dI(t)$ is substantially maximized by optimizing values for the output coupler, the means for applying and the nonlinear effective reflectivity.

5. A laser as claimed in claim 2 wherein said phase $\phi$ consists of a linear phase $\phi_l$ which varies s a function of the difference in cavity length and a nonlinear phase $\phi_{nl}$ which varies as a function of output intensity, including means for enhancing said nonlinear phase, whereby differential reflectivity is enhanced.

6. A laser as claimed in claim 5 wherein said means for increasing nonlinear phase includes means for increasing the laser intensity in the external cavity.

7. A laser as claimed in claim 5 wherein said means for increasing nonlinear phase includes means for increasing the length of the nonlinear media in said external cavity.

8. A laser as claimed in claim 5 wherein said means for increasing nonlinear phase includes means for enhancing the nonlinearity of the nonlinear medium in the external cavity.

9. A laser as claimed in claim 1 including means for causing the relative lengths of said cavities to remain stable.

10. A laser as claimed in claim 1 including means operative when pulsed laser output is achieved for adjusting the relative lengths of said cavities such that, at said means for combining, there is interferometric addition ·˝ peak outputs and interferometric cancellation of pulse wings, whereby the widths of the output laser pulses are shortened.

11. A laser as claimed in claim 10 including means for slowly adjusting the relative lengths of said cavities until said relative lengths is such that pulse operation is achieved; and wherein said means operative when pulsed output is achieved includes feedback means for achieving and maintaining the desired relative lengths.

12. A laser as claimed in claim 10 including a dispersive delay line, and means for applying said short-pulsed laser output to said delay line, whereby the length of said short laser pulses are further reduced.

13. A laser as claimed in claim 12 wherein said dispersive delay line is a pair of diffraction gratings.

14. A laser as claimed in claim 10 including a dispersive delay line which is incorporated internally into the external cavity, whereby the length of said short laser pulses are further reduced.

15. A laser as claimed in claim 1 wherein said lasing medium is $Ti:Al_2O_3$.

16. A laser as claimed in claim 1 wherein said nonlinear medium has an intensity dependent index of refraction.

17. A laser as claimed in claim 16 wherein said nonlinear medium is a single mode optical fiber which induces intensity dependent phase changes in an optical beam passing therethrough.

18. A laser as claimed in claim 1 including means operative when pulsed output is achieved for adjusting the length of at least one of the cavities to maintain a correct phase relationship for interfering outputs.

19. A laser as claimed in claim 18 wherein said adjusting means includes means for sensing changes in the laser output power; and means responsive to the sensed output power for maintaining the output power constant at a predetermined level.

20. A laser as claimed in claim 18 wherein said adjusting means includes means for sensing the second harmonic of the laser output, and means responsive to the sensed second harmonic for maintaining a predetermined desired pulse duration.

21. A laser as claimed in claim 18 wherein said adjusting means includes means for sensing the spectrum of the laser output, and means responsive to the sensed spectrum for maintaining a predetermined pulse duration.

22. A laser as claimed in claim 21 wherein said adjusting means includes means for sensing changes in the laser output power, and means for sensing the second harmonic of the laser output, said means responsive being responsive to the three means for sensing for maintaining a predetermined laser pulse duration.

23. A laser as claimed in claim 18 including means for detecting the laser output; and means responsive to said detecting means for controlling said means for adjusting.

24. A laser as claimed in claim 1 wherein said means for combining is inside said laser cavity.

25. A laser as claimed in claim 24 wherein said means for combining includes a beam splitter at the output end of said laser cavity, said beam splitter directing part of the laser output to the nonlinear cavity, and part through a linear arm, both parts being reflected back to be interferometrically combined at said beam splitter.

26. A laser as claimed in claim 1 including means for tuning said laser over predetermined selected frequency range.

27. A laser as claimed in claim 1 wherein the noise fluctuations are fast noise fluctuations with a width equal to or shorter than the cavity round trip time.

* * * * *